US012789598B2

United States Patent
Fulcher et al.

(10) Patent No.: US 12,789,598 B2
(45) Date of Patent: Nov. 10, 2026

(54) MULTILAYERED TETHER LINK FOR LIFTGATE

(71) Applicant: Magna Exteriors Inc., Aurora (CA)

(72) Inventors: Jason Fulcher, Lake Orion, MI (US); Trevor Franzen, Pleasant Ridge, MI (US)

(73) Assignee: Magna Exteriors Inc., Aurora (CA)

(*) Notice: Subject to any disclaimer, the term of this patent is extended or adjusted under 35 U.S.C. 154(b) by 468 days.

(21) Appl. No.: 18/260,486

(22) PCT Filed: Jan. 20, 2022

(86) PCT No.: PCT/US2022/013071
§ 371 (c)(1),
(2) Date: Jul. 6, 2023

(87) PCT Pub. No.: WO2022/159551
PCT Pub. Date: Jul. 28, 2022

(65) Prior Publication Data
US 2024/0300307 A1 Sep. 12, 2024

Related U.S. Application Data

(60) Provisional application No. 63/139,326, filed on Jan. 20, 2021.

(51) Int. Cl.
*B60J 5/10* (2006.01)

(52) U.S. Cl.
CPC .................................... *B60J 5/107* (2013.01)

(58) Field of Classification Search
CPC . B60J 5/107; B60J 5/0422; B60J 5/044; B60J 5/0461; B60J 5/0437; B60R 22/12; B60R 21/2338; B60R 21/2342; B60R 2021/23382–23388
USPC ...................................................... 296/146.6
See application file for complete search history.

(56) References Cited

U.S. PATENT DOCUMENTS

| | | | | |
|---|---|---|---|---|
| 5,362,101 | A | 11/1994 | Sugiura et al. | |
| 5,437,474 | A * | 8/1995 | Ament | B60R 21/06 410/118 |
| 11,634,013 | B2 | 4/2023 | Kuntze et al. | |
| 2002/0158456 | A1 | 10/2002 | Fischer | |
| 2009/0169321 | A1 * | 7/2009 | Flannigan | B60P 7/0807 410/101 |

(Continued)

FOREIGN PATENT DOCUMENTS

| | | |
|---|---|---|
| CN | 107009859 A | 8/2017 |
| CN | 108263182 A | 7/2018 |

(Continued)

OTHER PUBLICATIONS

Sato (JP 2006068984 A), machine translation (Year: 2006).*

(Continued)

*Primary Examiner* — Wenwei Zhuo

(57) ABSTRACT

A multilayered tether link for a vehicle tether (12). The tether includes a tether belt material sinuously folded about at least one wedge portion (24*a*. 24*b*). The wedge portion has a flat portion (32) and a widened end portion (30). After folding the belt material around the at least one wedge the combination is sewn together and a hole (28) drilled through the center for attachment to a vehicle part such as a liftgate.

23 Claims, 6 Drawing Sheets

(56) References Cited

U.S. PATENT DOCUMENTS

| | | | | |
|---|---|---|---|---|
| 2010/0257708 | A1* | 10/2010 | Ogawa | B60R 22/12 24/593.1 |
| 2017/0174057 | A1 | 6/2017 | Miyake et al. | |
| 2020/0198448 | A1* | 6/2020 | Coudron | B60J 5/0455 |

FOREIGN PATENT DOCUMENTS

| | | | | | |
|---|---|---|---|---|---|
| CN | 207697460 | U | * | 8/2018 | |
| CN | 110831798 | A | | 2/2020 | |
| CN | 114103610 | A | * | 3/2022 | B60J 5/107 |
| CN | 217197723 | U | * | 8/2022 | |
| DE | 4423741 | A1 | * | 1/1996 | B60J 5/044 |
| EP | 2666665 | A1 | * | 11/2013 | B60P 7/0807 |
| EP | 3670274 | A1 | | 6/2020 | |
| JP | 2006068984 | A | * | 3/2006 | |
| JP | 2011081917 | A | * | 4/2011 | |
| WO | 2013055656 | A1 | | 4/2013 | |
| WO | 2019006271 | A1 | | 1/2019 | |

OTHER PUBLICATIONS

Igawa (JP 2011081917 A), machine translation (Year: 2011).*
Chen et al. (CN 217197723 U) (Year: 2022).*
Chinese Office Action for Application No. 202280010593.2 mailed Oct. 20, 2024 and English translation.
Chinese 2nd Office Action as well as the English translation for Application No. 202280010593.2 mailed May 17, 2025.
Korean Office Action as well as the English translation for Application No. 10-2023-7024640 mailed Feb. 20, 2025.
Notification of Transmittal of the International Search Report and the Written Opinion of the International Searching Authority for International Application No. PCT/US2022/013071, Mailed May 20, 2022.
CN Office Action for CN Application No. 202280010593.2 dated Jan. 9, 2026 (15 pages).

* cited by examiner

MULTILAYERED TETHER LINK FOR LIFTGATE

CROSS-REFERENCE TO RELATED APPLICATIONS

This application is a National Stage Utility Application under 35 USC 371 claiming priority to PCT International Application PCT/US2022/013071, filed Jan. 20, 2022, which claims the benefit of U.S. Provisional Application No. 63/139,326, filed Jan. 20, 2021. The disclosures are incorporated herein by reference.

FIELD OF THE INVENTION

The present invention relates to a tether component and method of manufacturing the tether component, which is implemented in a liftgate for an automobile.

BACKGROUND OF THE INVENTION

One of the current trends in the automobile industry is to lower vehicle weight to help achieve better fuel economy, thus helping to meet fuel economy standards and to offset the higher fuel prices. Another trend is that there is a broader range of vehicle models, which in turn reduces the volume of vehicles produced on a per model basis. Liftgates are traditionally made from stamped steel panels that are heavy and have a high tooling cost and are susceptible to corrosion. Sheet Molding Compound (SMC) is an alternative to steel for the inner and outer panels of the liftgate. Using SMC has several manufacturing concerns related to the material and process. Steel and SMC liftgates have a mass penalty over thermoplastics. There are also styling restrictions with traditional sheet metal and SMC components.

In certain applications where liftgates are made from composite materials. Tethers made from steel are used to strengthen the liftgate and help maintain the integrity of the liftgate upon impact. The use of steel tethers can be difficult to attach and increase the assembly complicity. It is therefore desirable to design liftgates that have tether systems that are easier to assemble, require less attachment points and still provide the desired level of strength to the liftgate while allowing for maintaining the integrity of the liftgate upon impact.

Over molded ends are sometimes used in flexible tether arrangements such as with belt materials or wires to help the fibers of the tether in such a way that the integrity and strength of the individual fibers is preserved. However, overmolding processes are costly and time consuming because of added tooling and labor costs during manufacture. It is further a desirable to provide a tether system that is flexible and is connected to the liftgate panel through apertures without the necessity of overmolding. It is also desirable to provide a tether system that has failure modes, such as a controlled release failure mode.

It is desirable to develop lower cost tethers that would reduce or eliminate overmolding to the tether belt material but still provide the desired performance. Therefore, it is a goal to provide a lightweight, consistent failure mode tether using more readily available materials to keep costs down.

SUMMARY OF THE INVENTION

The present invention relates to a multilayered tether link for a vehicle tether implemented in a molded vehicle liftgate. The tether has two ends and connects to a vehicle part using a folded wedge section and a folded section of the tether. There is a folded wedge section formed by a tether belt material being sinuously being folded about at least one wedge portion. The tether belt material and the at least one wedge portion are sewn together with at least one stitch to form a layered construction. The layered construction has a hole is formed through the layered construction for attachment to a vehicle part.

The multilayered tether link further includes a folded section having a plurality of layers of sinuously folded tether belt material folded adjacently to form a plurality of layers. The folded section further includes at least one stitch connecting the plurality of layers together. Also provided is a hole formed through the center of the folded section for attachment to a vehicle part. The vehicle part can be any component of the liftgate and can include the liftgate inner panel, wiper motor housing, support brackets, outer panel of the liftgate, latch mounting bracket or latch actuator housing.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments are merely exemplary in nature and is in no way intended to limit the invention, its application, or uses.

Figure 1:
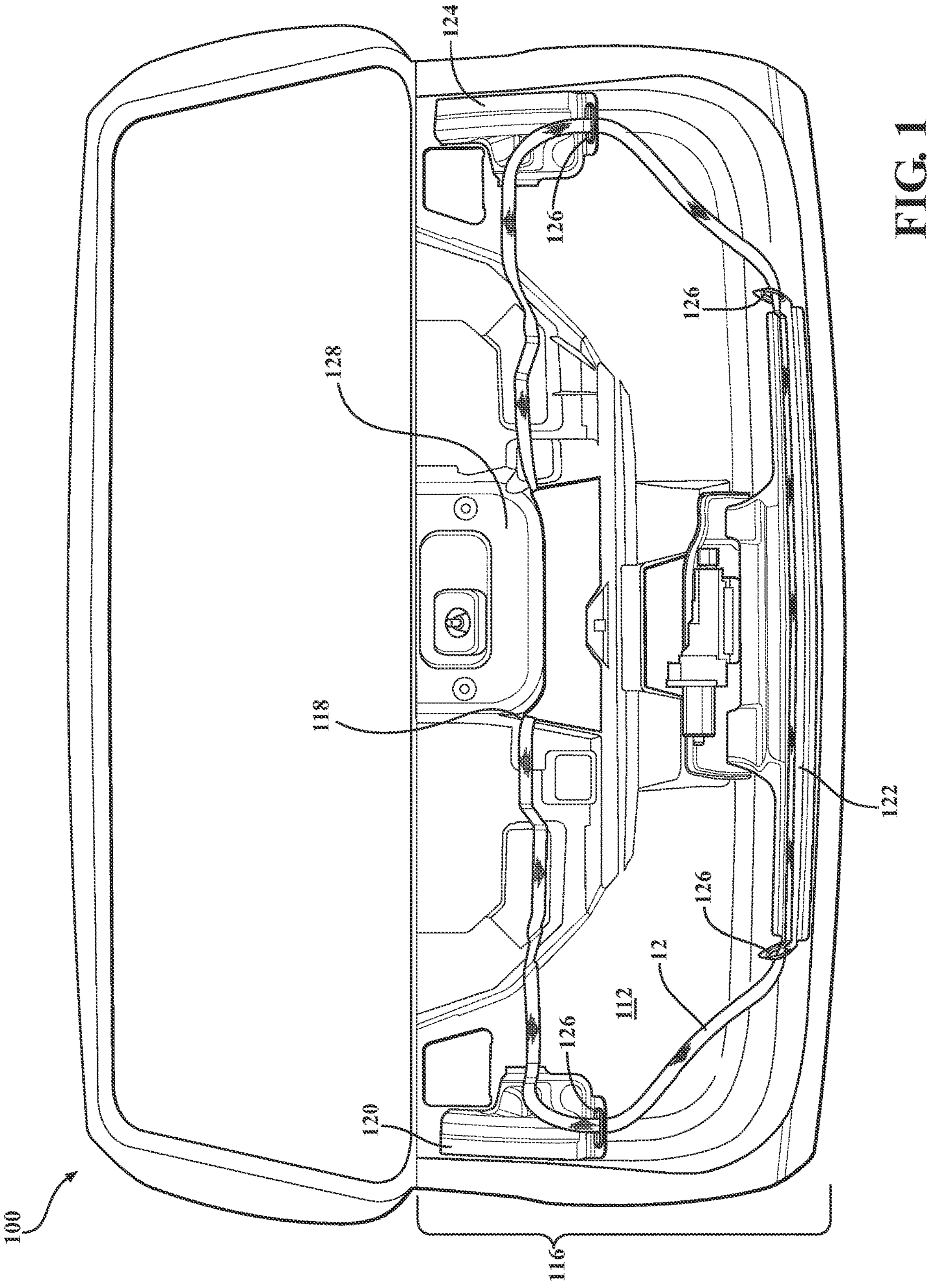
FIG. 1 is a rear elevational view of a liftgate inner panel having a multilayered tether link connected thereon.
Figure 2:
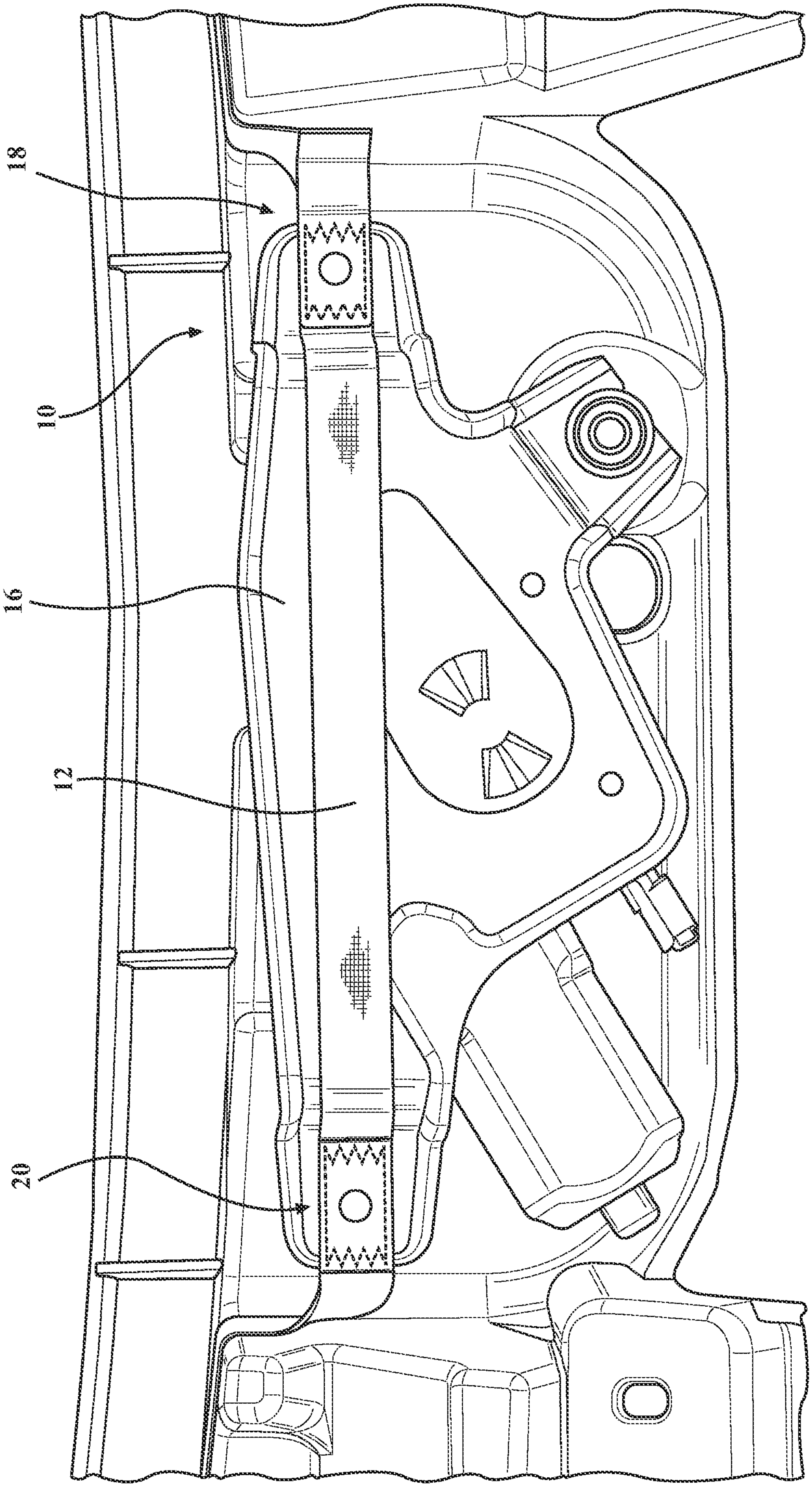
FIG. 2 is an enlarged rear elevational view of the multilayered tether link end of the present invention installed on a liftgate of a vehicle.
Figure 3:
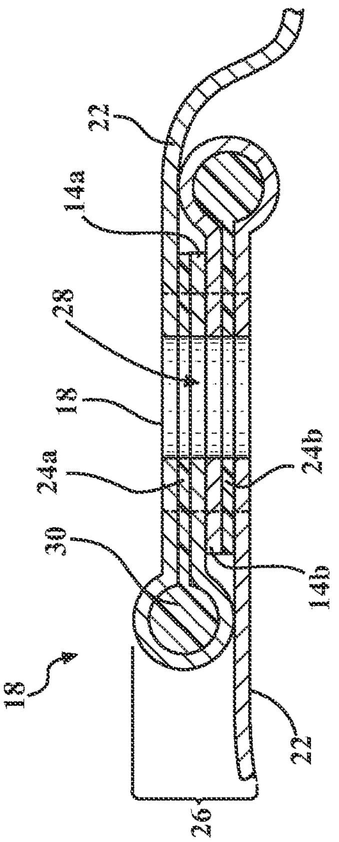
FIG. 3 is a cross-sectional side elevation view of a folded wedge section of the multilayered tether link in accordance with the present invention.
Figure 4:
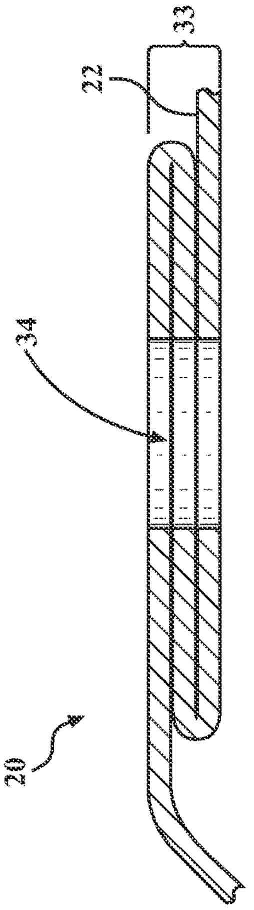
FIG. 4 is a cross-sectional side elevation view of a folded section of the multilayered tether link in accordance with the present invention.
Figure 5:
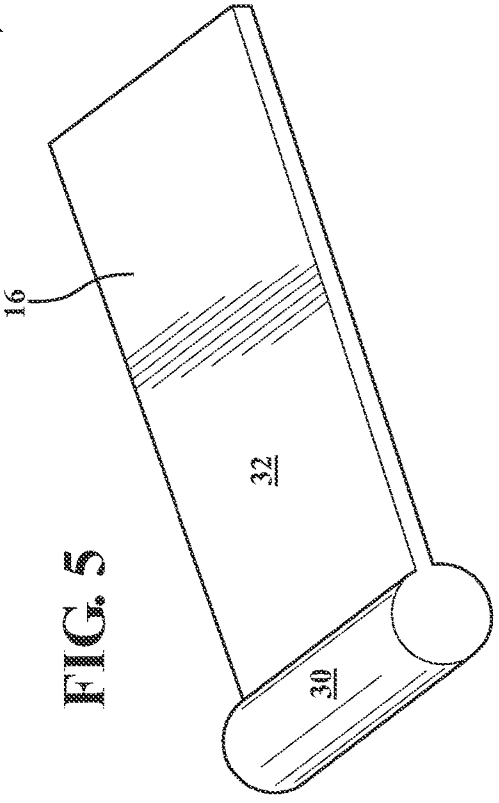
FIG. 5 is top side perspective view of wedge portion.

Referring now to FIG. 1 there is shown a structural inner panel 100 of a vehicle liftgate. The structural inner panel 100 has an outside surface 112 and an inner surface. The structural inner panel 100 is covered by an outer panel or outer panels (not shown) that have an exterior show surface. The liftgate structure, and the structural inner panel 100 are made of composite material, however, it is within the scope of this invention for different materials to be used such as aluminum, manufactured diecast, metal, etc. The structural inner panel 100 has a lower perimeter surface area 116 extending across substantially the entire width of the structural inner panel 100. The structural inner panel 100 also includes a wiper motor housing recess 118 for holding a wiper motor. Also included is a plurality of brackets including a left side bracket 120, a center lower bracket 122 and a right side bracket 124. It is within the scope of this invention for a greater or fewer number of brackets to be implemented depending on the particular application. The plurality of brackets are connected to the outside surface 112 of the structural inner panel 100. Each of the plurality of brackets also include one or more friendly holes 126, which are apertures through the respective brackets that allow for a tether 12 to pass through. The friendly holes 126 each have a curled edge that creates a smooth edge to prevent any snagging of the tether 12 material.

The tether 12 includes two ends each for connecting the tether 12 to a vehicle part, which in the current embodiment of the invention is a wiper motor housing 128 in the wiper motor housing recess 118. The tether 12 is positioned through each of the friendly holes 126 of each of the plurality brackets 120, 122, 124.

While the present embodiment of the invention depicts the tether 12 as being routed through various bracket members, it is within the scope of this invention for the friendly holes 126, to be formed with the structural inner panel 100, thereby eliminating the need for different brackets 120, 122, 124. Additionally, the placement of the brackets 120, 122, 124 are located in predetermined tether reinforcement zones, which are areas on the structural inner panel 100 that are determined to be structurally stronger areas of the liftgate than the portions of the inner panel not located in the tether reinforcement zones. The tether reinforcement zones are best for placement of connections for the tether 12. The structural reinforcement zones allow for the tether 12 to span areas of the composite liftgates that are structurally weaker and will benefit from having the tether 12 passing across the weaker area to be connected to the tether reinforcement zones of the liftgate. The location of the tether reinforcement zones can vary depending upon the design of the liftgate. Factors such as shape, material thickness, material makeup and the dimensions of the liftgate can have an effect on the location of the tether reinforcement zone. Routing the tether 12 between each tether reinforcement zones causes the tether 12 to cross weaker areas of the liftgate to create a type of safety net that will hold the structural inner panel together in the event of breaking of the structural inner panel in the weaker areas between the tether reinforcement zones.

The tether 12 has a specialized construction forming part of a multilayered tether link that is shown in FIGS. 2-5, 6B and 7 will now be described in greater detail. The tether 12 has two ends 14*a*, 14*b* that connect to a vehicle part 16 using a folded wedge section 18 and a folded section 20 of the tether 12. The folded wedge section 18 is formed by a tether belt material 22 being sinuously being folded about at least one wedge portion, which the present embodiment of the invention uses two wedge portions 24*a*, 24*b*. Each wedge portion 24*a*, 24*b* is preferably a polymer plastic material such as a thermoplastic olefin material. The tether belt material 22 can be any suitable material, however, in one embodiment of the invention the tether belt material 22 is polyester or MYLAR biaxially oriented polyethylene terephthalate (Bo PET)) material.

Figure 6A:
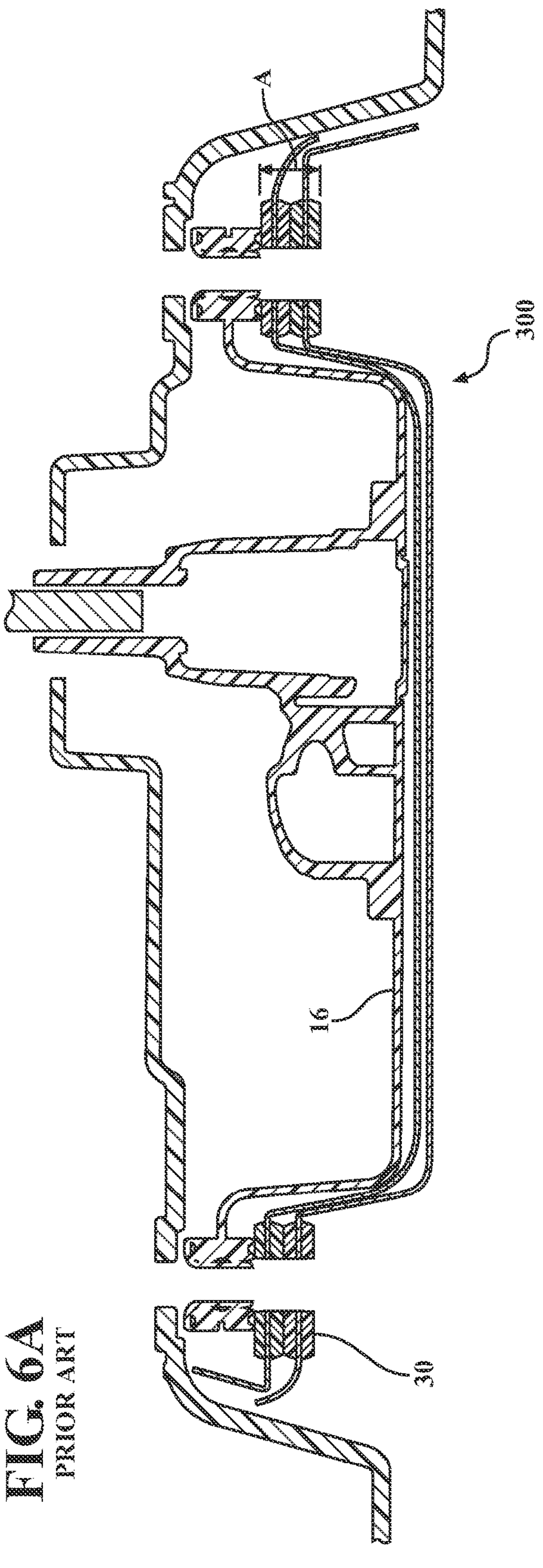
FIG. 6A PRIOR ART
FIG. 6A is a top cross-sectional view of a prior art overmolded tether link connected to a vehicle part.

As shown the tether 12 has an end 14*a* that is folded about wedge portion 24*a*, while end 14*b* is folded about wedge portion 24*b*. The wedge portions 24*a*, 24*b* are used in the present embodiment of the invention, but they are optional and in some embodiments of the invention they are not used due to the requirements of a particular design. For example, FIG. 6C shows a multilayered tether link 200 with a tether 202 that has a first folded section 204 and a second folded section 206 are connected to a vehicle part 216. Both the first folded section 204 and second folded section 206 do not have any wedge portions that are present in the multilayered tether link 10 embodiment shown in FIG. 6B.

Referring back to FIGS. 1-5, 6B and 7, the tether belt material 22 and the two wedge portions 24*a*, 24*b* are sewn together with at least one stitch to form a layered construction 26. The layered construction 26 has a hole 28 formed through the layered construction 26 for attachment to a vehicle part 16. The hole 28 is formed ultrasonically using heat knife that prevents fraying. The hole 28 is configured to allow a fastener 29 to pass through the layered construction 26 for connecting the tether 12 to the vehicle part 16. The wedge portions 24*a*, 24*b* are designed to transfer the force loads between the tether 12 and the stitching in a more consistent manner. Each of the two wedge sections 24*a*, 24*b* includes a widened end portion 30 and a flat portion 32. The widened end portion 30 has a round cross-section and the tether belt material 22 wraps around the radius the widened end portion 30 when forming the layered construction 26. This helps to eliminate a flat edge in the area where the tether belt material 22 wraps around the wedge section 24*a*, 24*b*, which if a flat edge were present could cut the tether belt material 22 and cause failure when force is exerted on the multilayered tether link 10 during a vehicle accident.

The multilayered tether link 10 further includes a folded section 20 having a plurality of layers of sinuously folded tether belt material folded adjacently to form a layered construction 33. In a preferred embodiment the belt material 14 of the folded section is wound in sinusoidally upon itself to provide an 's' type arrangement. The folded section further includes at least one stitch connecting the plurality of layers together. Also provided is a hole 34 formed through the center of the layered construction 33 for attachment to the vehicle part 16. The hole 34 is formed ultrasonically using heat knife that prevents fraying. The vehicle part 16 can be any component of the liftgate and can include the liftgate inner panel, wiper motor housing, support brackets, outer panel of the liftgate, latch mounting bracket or latch actuator housing.

The vehicle part 16 can be any component of a liftgate for a vehicle and can include the liftgate inner panel, wiper motor housing, support brackets, outer panel of the liftgate, latch mounting bracket or latch actuator housing. Regarding the tether belt material 22, Suitable tether belt materials are selected from the group of woven materials including polyester, nylon, aramid fibers including para-phenylene-terephtalamide, each alone or in combination.

Figure 7:
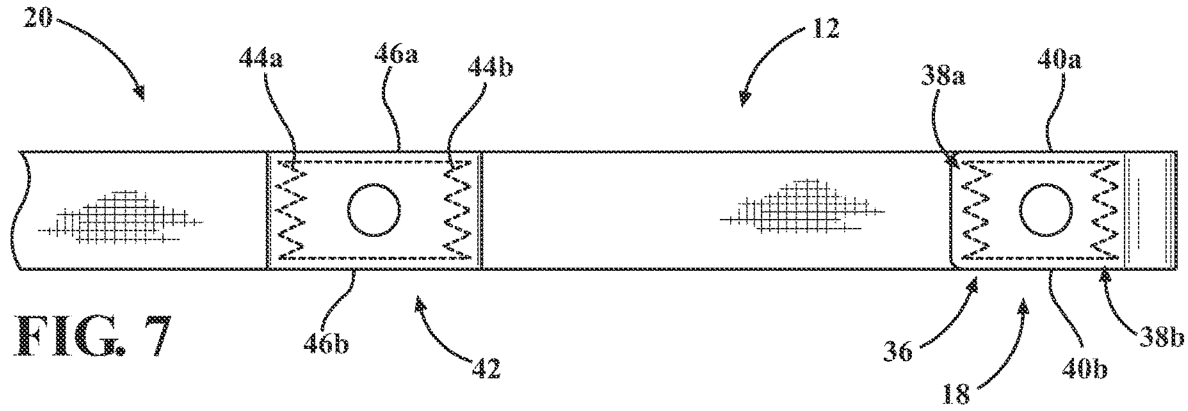
FIG. 7 is a top plan view of a tether according to one embodiment of the invention.

The multilayered tether link 10 is connected to the vehicle part 16 it will provide controlled release of the tether 12 upon experiencing force of an impact of accident. The controlled release of the tether 12 is provided by the combination of the folding of the tether belt material 22 in the area of the folded wedge section 18 and the at least one stitch forming the layered construction 26 of the folded wedge section 18, and the folded section 20 and the at least one stitch forming the layered construction 33. Referring now to FIG. 7 the stitch details on the tether 12 are shown and described. The folded wedge section 18 has at least one stitch 36 generally shown. The at least one stitch 36 includes two tight stitch sections 38*a*, 38*b* that are joined at opposing ends by two load transfer stitch sections 40*a*, 40*b*. Similarly, the folded section 20 has at least one stitch 42 generally shown. The at least one stitch 42 includes two tight stitch sections 44*a*, 44*b* that are joined at opposing ends by two load transfer stitch sections 46*a*, 46*b*. During an adverse event such as a vehicle crash where force is applied to the tether 12, forces act on each tight stitch section 38*a*, 38*b*, 44*a*, 44*b* with each load transfer stitch section 40*a*, 40*b*, 46*a*, 46*b* transferring load between the respective tight stitch section 38*a*, 38*b*, 44*a*, 44*b* in order to control the unravelling of the tether 12 and to maximize the absorbance of unwanted forces.

Figure 6B:
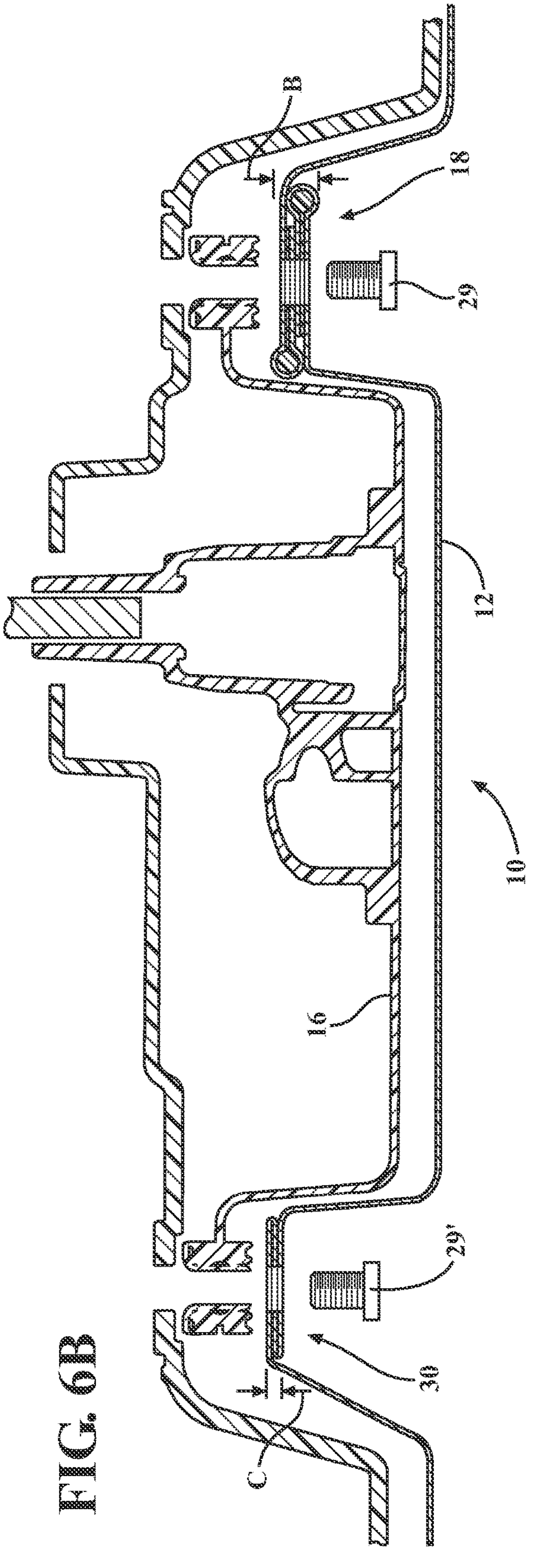
FIG. 6B is a top cross-sectional view of a multilayered tether link connected to a vehicle part in accordance with one embodiment of the invention.
Figure 6C:
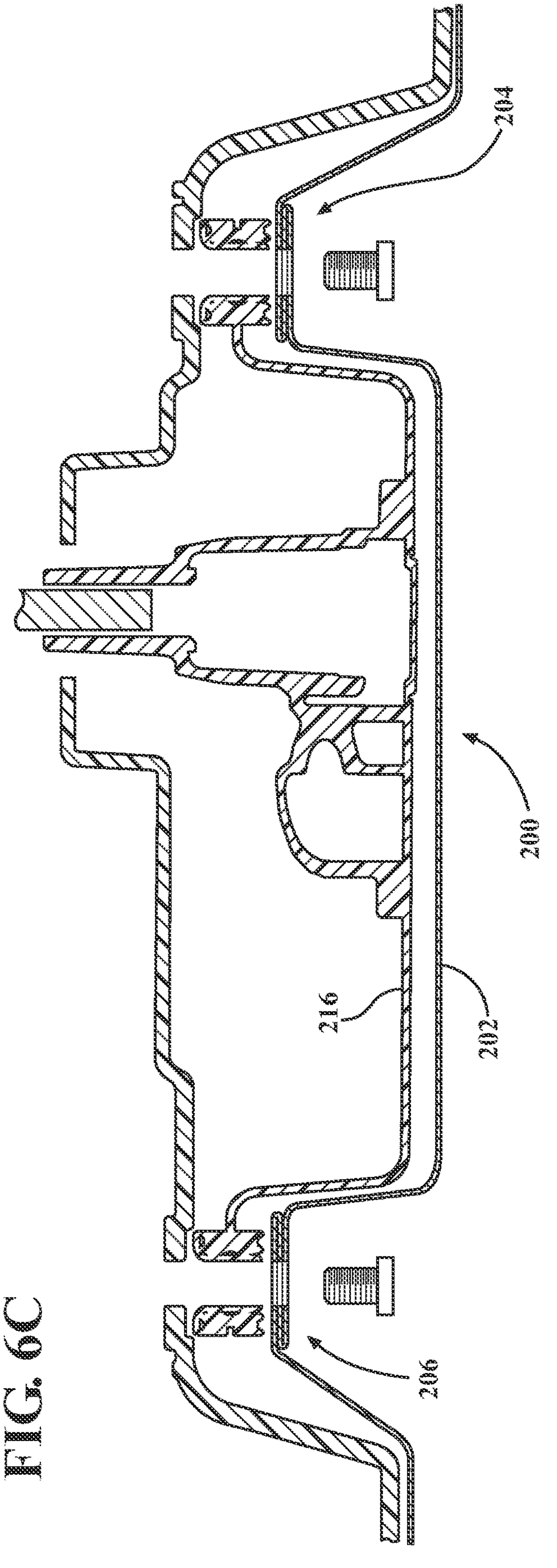
FIG. 6C is a top cross-sectional view of a multilayered tether link connected to a vehicle part in accordance with another embodiment of the invention.

The multilayered tether link 10, 200 shown in FIGS. 1-5, 6*b*, 6C and 7 provide a significant packaging and force absorption advantage over applications the use an overmolded tether. For example, FIG. 6A shows a prior art overmolded tether 300 connected to the liftgate. As shown the overmolded portions of the tether 300 has overmolded connection features that have a stack height A. FIG. 6B shows that the tether 12 has a stack height B for the folded wedge section 18 and a stack height C for the folded section 20. Both the stack height B and stack height C are much smaller than the stack height A attained using the tether 300 with overmolding. The tether 10, 200 have a distinct packaging advantage over tether 300.

Figure 8A:
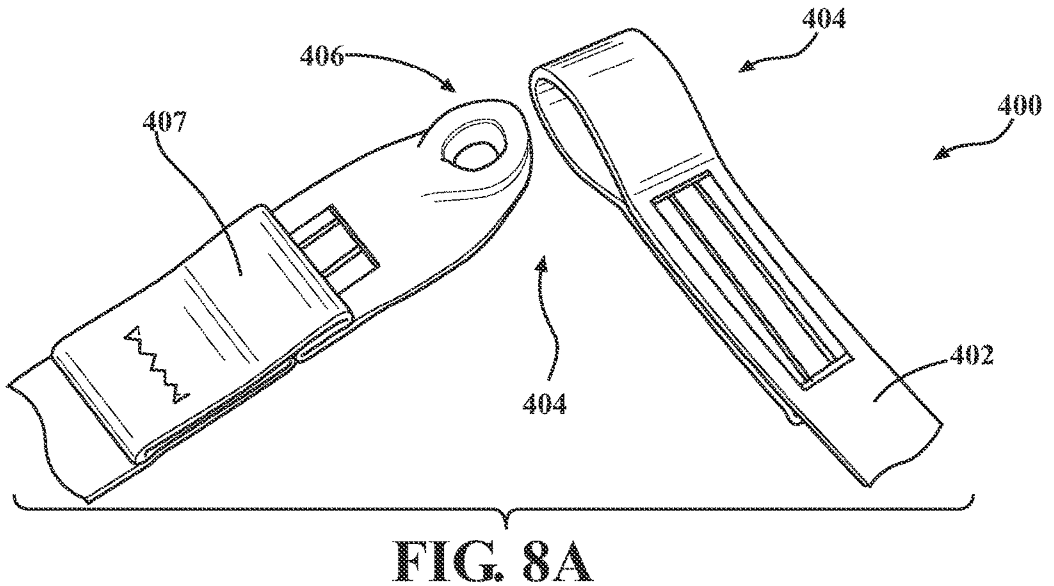
FIG. 8A is an enlarged perspective view of an alternate tether according to an alternate embodiment of the invention.
Figure 8B:
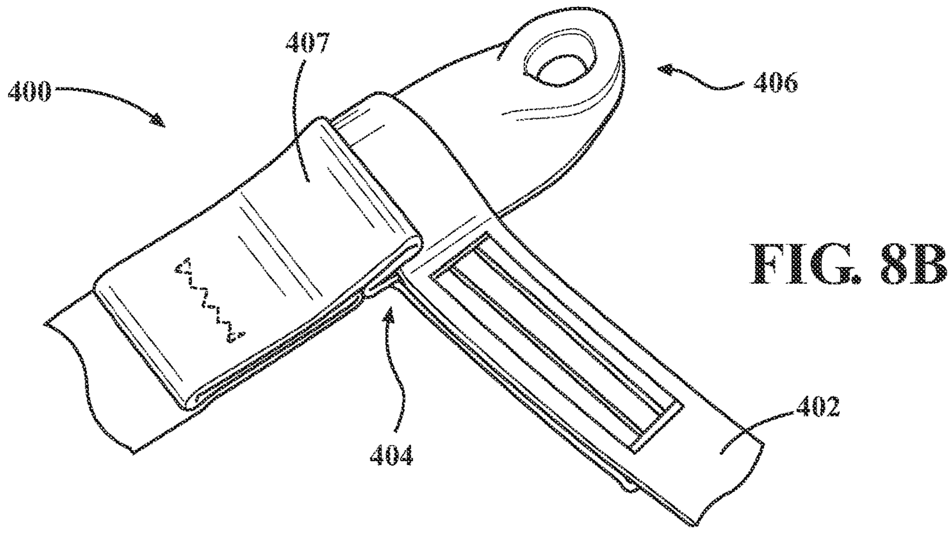
FIG. 8B is an enlarged perspective view of an alternate tether according to an alternate embodiment of the invention.

Referring now to FIGS. 8A and 8B an alternate tether 400 design is shown. The tether 400 has a loop end 404 with an aperture formed by a loop of the tether material. An eyelet end 406 of the tether 400 has an aperture for receiving a fastener for connecting the tether 400 to a vehicle part. During connection, the eyelet end 406 is passed through the loop end 404 and secured to the vehicle part. A stopper fold 407 on the eyelet end is created by folding the tether belt material and stitching it together. The loop end 404 is held in place between the stopper fold 407 and the fastened down eyelet end 406.

The description of the invention is merely exemplary in nature and, thus, variations that do not depart from the essence of the invention are intended to be within the scope of the invention. Such variations are not to be regarded as a departure from the spirit and scope of the invention.

What is claimed is:

1. A multilayered tether link for a vehicle tether comprising:

a tether belt material having a folded wedge section formed by the tether belt material being sinuously folded about at least one wedge portion, wherein the tether belt material and the at least one wedge portion are sewn together with at least one stitch to form a layered construction and a hole is formed through the layered construction for attachment to a vehicle part.

2. The multilayered tether link of claim 1 wherein the at least one wedge portion has a flat portion and a widened end portion, where the tether belt material wraps around the widened end portion and the hole is formed through the flat portion.

3. The multilayered tether link of claim 1 further comprising:

wherein the at least one wedge portion of the folded wedge section includes a first wedge portion and a second wedge portion, wherein a first end of the tether belt material is wound around the first wedge portion and a second end of the tether belt material is wound around the second wedge portion, and the first wedge portion with the tether belt material of the first end are placed adjacent the second wedge portion with the tether belt material of the second end wound around the second wedge portion to create the layered construction, and the hole formed through the layered construction.

4. The multilayered tether link of claim 3 wherein the first wedge portion and the second wedge portion each have a flat portion and a widened end portion, where the first end of the tether belt material wraps around the widened end portion of the first wedge portion and the hole is formed through the flat portion, the second end of the tether belt material wraps around the widened end portion of the second wedge portion and the hole is formed through the flat portion.

5. The multilayered tether link of claim 1 wherein the at least one stitch of the layered construction is releasable if a predetermined amount of force is experienced by the tether belt material.

6. The multilayered tether link of claim 1 wherein the hole is formed ultrasonically.

7. The multilayered tether link of claim 1 wherein the tether belt material is one of a polyester, nylon, aramid fiber material including para-phenylene-terephthalamide or biaxially oriented polyethylene terephthalate material that is cut with a heat knife to prevent fraying.

8. The multilayered tether link of claim 1 further comprising a folded section of the tether belt material for attachment to a surface of the vehicle part, the folded section comprising a portion of the tether belt material being folded twice back on the tether belt material and sewn together for forming a three layered construction;

a hole formed through the three layered construction for attaching the folded section to the vehicle part.

9. The multilayered tether link of claim 8 wherein the hole in the folded section is ultrasonically cut through the three layered construction.

10. The multilayer tether link of claim 1 wherein the at least one stitch of the folded wedge section includes at least two tight stitch sections joined by at least one load transfer stitch section to provide a controlled break at a predetermined force.

11. A multilayered tether link for a vehicle tether comprising:

a folded wedge section formed by a tether belt material being sinuously folded about at least one wedge portion, wherein the tether belt material and the at least one wedge portion are sewn together with at least one stitch to form a layered construction and a hole is formed through the layered construction for attachment to a vehicle part, and a folded section having a plurality of layers of sinuously folded tether belt material folded adjacently to form a layered construction, where the layered construction of the folded section includes at least one stitch connecting the plurality of layers together and a hole formed through the center of the folded section for attachment to the vehicle part or a different vehicle part.

12. The multilayered tether link of claim 11 wherein the at least one wedge portion has a flat portion and a widened end portion, where the tether belt material wraps around the widened end portion and the hole of the folded wedge section is formed through the flat portion.

13. The multilayered tether link of claim 11 further comprising:

wherein the at least one wedge portion of the folded wedge section includes a first wedge portion and a second wedge portion, wherein a first end of the tether belt material is wound around the first wedge portion and a second end of the tether belt material is wound around the second wedge portion, and the first wedge portion with the tether belt material of the first end are placed adjacent the second wedge portion with the tether belt material of the second end wound around the second wedge portion to create the layered construction, and the hole of the folded wedge section is formed through the layered construction of the at least one wedge portion.

14. The multilayered tether link of claim 13 wherein the first wedge portion and the second wedge portion each have a flat portion and a widened end portion, where the first end of the tether belt material wraps around the widened end portion of the first wedge portion and the hole of the folded wedge section is formed through the flat portion, the second end of the tether belt material wraps around the widened end portion of the second wedge portion and the hole of the folded wedge section is formed through the flat portion.

15. The multilayered tether link of claim 11 wherein the hole in the folded wedge section and the hole in the folded section are formed ultrasonically.

16. The multilayered tether link of claim 15 wherein the tether belt material is one of a polyester, nylon, aramid fiber material including para-phenylene-terephthalamide or biaxially oriented polyethylene terephthalate material that is cut with a heat knife to prevent fraying.

17. The multilayered tether link of claim 11 wherein the folded section includes a portion of the tether belt material being folded twice back on the tether belt material and sewn together for forming a three layered construction.

18. The multilayer tether link of claim 11 wherein the at least one stitch of the folded wedge section and the at least one stitch of the folded section each include at least two tight stitch sections joined by at least one load transfer stitch section to provide a controlled break at a predetermined force.

19. A multilayered tether link for a vehicle tether comprising:

a first folded section having a plurality of layers of sinuously folded tether belt material folded adjacently to form a layered construction, where the layered construction of the folded section includes at least one stitch connecting the plurality of layers together and a hole formed through the center of the first folded section for attachment to a vehicle part, and a second folded section having a plurality of layers of sinuously folded tether belt material folded adjacently to form a second layered construction, where the second layered construction of the second folded section includes at least one stitch connecting the plurality of layers together and a hole formed through the center of the second folded section for attachment to the vehicle part, wherein a continuous portion of tether belt material forms the first folded section and the second folded section.

20. The multilayered tether link of claim 19 wherein part of the continuous portion of the tether belt material extends between the first folded section and the second folded section.

21. The multilayered tether link of claim 19 wherein the tether belt material is one of a polyester, nylon, aramid fiber material including para-phenylene-terephthalamide or biaxially oriented polyethylene terephthalate material that is cut with a heat knife to prevent fraying.

22. The multilayered tether link of claim 19 wherein the first folded section and the second folded section both include a portion of the tether belt material being folded twice back on the tether belt material and sewn together for forming a three layered construction.

23. The multilayer tether link of claim 19 wherein the at least one stitch of the first folded section and the at least one stitch of the second folded section each include at least two tight stitch sections joined by at least one load transfer stitch section to provide a controlled break at a predetermined force.

* * * * *